(12) United States Patent
Ashida et al.

(10) Patent No.: US 11,851,812 B2
(45) Date of Patent: Dec. 26, 2023

(54) GRAINED LEATHER-LIKE SHEET

(71) Applicant: KURARAY CO., LTD., Kurashiki (JP)

(72) Inventors: Tetsuya Ashida, Osaka (JP); Kansai Hara, Osaka (JP)

(73) Assignee: KURARAY CO., LTD., Kurashiki (JP)

( * ) Notice: Subject to any disclaimer, the term of this patent is extended or adjusted under 35 U.S.C. 154(b) by 634 days.

(21) Appl. No.: 17/053,268

(22) PCT Filed: Apr. 19, 2019

(86) PCT No.: PCT/JP2019/016820
§ 371 (c)(1),
(2) Date: Nov. 5, 2020

(87) PCT Pub. No.: WO2019/216164
PCT Pub. Date: Nov. 14, 2019

(65) Prior Publication Data
US 2021/0285152 A1    Sep. 16, 2021

(30) Foreign Application Priority Data

May 9, 2018 (JP) .................................. 2018-090999

(51) Int. Cl.
*D06N 3/14* (2006.01)
*D06N 3/00* (2006.01)

(52) U.S. Cl.
CPC ........... *D06N 3/145* (2013.01); *D06N 3/0065* (2013.01); *D06N 2211/28* (2013.01)

(58) Field of Classification Search
CPC ...... D06N 3/00; D06N 3/0011; D06N 3/0065; D06N 3/14; D06N 3/145; D06N 3/146; D06N 2211/28; B32B 27/20; B32B 27/40
See application file for complete search history.

(56) References Cited

U.S. PATENT DOCUMENTS

2006/0035556 A1    2/2006 Yokoi et al.
2007/0231546 A1    10/2007 Xia et al.
(Continued)

FOREIGN PATENT DOCUMENTS

CN    1650066 A    8/2005
JP    2004-52120 A    2/2004
(Continued)

OTHER PUBLICATIONS

International Search Report dated Jun. 11, 2019 in PCT/JP2019/016820 filed on Apr. 19, 2019.
(Continued)

*Primary Examiner* — Jeremy R Pierce
*Assistant Examiner* — Christine X Nisula
(74) *Attorney, Agent, or Firm* — Oblon, McClelland, Maier & Neustadt, L.L.P.

(57) ABSTRACT

Disclosed is a grain-finished leather-like sheet including a polyurethane skin film containing a polyether-based polyurethane, wherein the polyurethane skin film contains a quinacridone-based red pigment, and is colored in a red color having an L* value of ≤80, an a* value of ≥20, and a b* value of ≤15 in an L*a*b* color system, and the number of cycles of a flexing endurance test at which cracking occurs in a surface of the polyurethane skin film is 100000 or more, when the flexing endurance test is performed on the grain-finished leather-like sheet under an environment of 20° C. using a flexometer after the grain-finished leather-like sheet has been irradiated with carbon arc at a black panel temperature of 63° C. for 100 hours with an irradiance of 500±50 W/m², using ultraviolet carbon arc lamp light compliant with JIS B 7751.

16 Claims, 1 Drawing Sheet

(56) References Cited

U.S. PATENT DOCUMENTS

| | | | |
|---|---|---|---|
| 2009/0268278 A1* | 10/2009 | Suzuki | B32B 27/20 |
| | | | 359/359 |
| 2010/0068499 A1* | 3/2010 | Kanagawa | D06N 3/145 |
| | | | 522/170 |
| 2015/0247043 A1 | 9/2015 | Berger et al. | |
| 2015/0299511 A1 | 10/2015 | Hong. et al. | |
| 2015/0342276 A1 | 12/2015 | Yamasaki et al. | |
| 2016/0129665 A1 | 5/2016 | Cho et al. | |

FOREIGN PATENT DOCUMENTS

| | | |
|---|---|---|
| JP | 2006-283221 A | 10/2006 |
| JP | 2015-52093 A | 3/2015 |
| JP | 2016-20549 A | 2/2016 |
| JP | 2016-505648 A | 2/2016 |
| JP | 2016-89326 A | 5/2016 |

OTHER PUBLICATIONS

Extended European Search Report dated May 17, 2022 in European Patent Application No. 19799107.8, 9 pages.

* cited by examiner

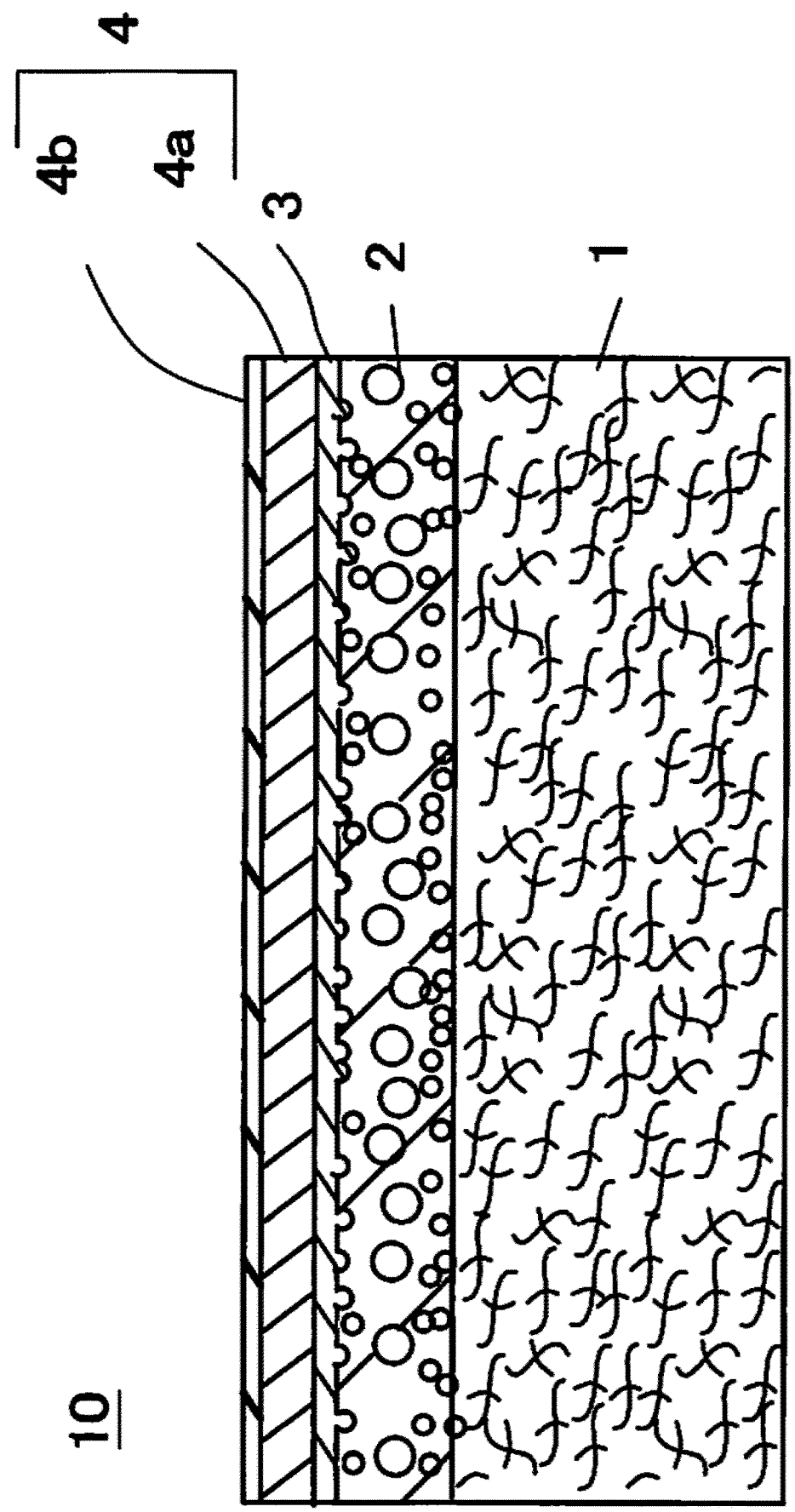

GRAINED LEATHER-LIKE SHEET

TECHNICAL FIELD

The present invention relates to a grain-finished leather-like sheet.

BACKGROUND ART

Grain-finished leather-like sheets such as an artificial leather with a grain-finished external appearance are used as the raw materials of bags, clothing, shoes, and the like. As a grain-finished leather-like sheet, a grain-finished leather-like sheet including a fiber base material and a polyurethane skin film stacked on the fiber base material is known. For example, as a synthetic leather for a steering wheel cover with enhanced durability, a synthetic leather for a steering wheel cover is disclosed in which a fiber base material including a non-woven fabric of filament-type, high-density ultrafine yarns, a urethane pore layer having minute pores, a urethane adhesion layer containing a urethane-based adhesive for bonding the urethane pore layer and a polyurethane skin layer are stacked in this order, and a polyurethane skin layer containing a polyurethane resin produced by polymerization of an isocyanate compound and a polyol compound containing a polycarbonate-based polyol, a fluorine-based polyol, and an ester-based polyol.

A grain-finished leather-like sheet is usually colored before use. Grain-finished leather-like sheets colored in a great variety of red-based colors are known.

Although not as a technique relating to grain-finished leather-like sheets, PTL 2 listed below, for example, discloses coloring a polyurethane resin with a quinacridone red and adding thereto a hindered amine-based light stabilizer as a light stabilizer in the case of producing the polyurethane resin as a two-part curable polyurethane resin. PTL 3 listed below discloses an aqueous dispersion containing a pigment (B), a polyurethane (A), and also at least one polymerization inhibitor or stabilizer (C), wherein a quinacridone red is the pigment (B) and a hindered amine light stabilizer (HALS) is the stabilizer (C). PTL 4 listed below discloses adding a quinacridone-based pigment or a hindered amine-based ultraviolet absorber to a polyurethane resin used as an artificial leather, a synthetic leather, or elastic fibers.

CITATION LIST

Patent Literatures

[PTL 1] Japanese Laid-Open Patent Publication No. 2016-89326
[PTL 2] Japanese Laid-Open Patent Publication No. 2016-20549
[PTL 3] Japanese Laid-Open Patent Publication No. 2016-505648
[PTL 4] Japanese Laid-Open Patent Publication No. 2015-052093

SUMMARY OF INVENTION

Technical Problem

As grain-finished leather-like sheets, those that are colored in a great variety of red-based colors using a various pigments in combination are known. In some rare cases, in a grain-finished leather-like sheet colored in a red-based color, cracking may occur over time in a polyurethane skin film, which is the colored layer of the grain-finished leather-like sheet. To analyze the factors of causing cracking in a polyurethane skin film colored in a red-based color, the present inventors have conducted extensive studies on methods of causing cracking in the polyurethane skin film. As a result, according to a test in which a polyurethane skin film is irradiated with carbon arc for 100 hours at a black panel temperature of 63° C. with an irradiance of 500±50 W/m$^2$, using ultraviolet carbon arc lamp light compliant with JIS B 7751, and thereafter repeatedly subjected to a flexing endurance test using a flexometer under an environment of 20° C. for several tens of thousands of cycles to several hundred thousand cycles (hereinafter also referred to as "light-resistant flexing endurance test"), the inventors were able to reproduce cracking occurring in the surface.

Then, as a result of extensive studies on the causes of cracking based on the results of the light-resistant flexing endurance test, the present inventors have found that the occurrence rate of cracking is significantly high when the polyurethane skin film is colored in a red-based bluish color by mixing a quinacridone-based red pigment at a relatively high rate. The inventors have also found that in the case of using, in particular, a polyurethane skin film containing a polyether-based polyurethane and a quinacridone-based red pigment in combination, the occurrence rate of cracking is increased. Then, based on that finding, the inventors have arrived at a grain-finished leather-like sheet in which cracking occurring over time can be suppressed, wherein the grain-finished leather-like sheet is a polyurethane skin film that includes a polyether-based polyurethane, contains a quinacridone-based red pigment, and is colored in a bluish red color.

It is an object of the present invention to provide a grain-finished leather-like sheet in which cracks are less likely to be produced over time, wherein the grain-finished leather-like sheet includes a polyurethane skin film including a polyether-based polyurethane, and is colored in a bluish red color with a quinacridone-based red pigment.

Solution to Problem

An aspect of the present invention is directed to a grain-finished leather-like sheet including a polyurethane skin film containing a polyether-based polyurethane, wherein the polyurethane skin film contains a quinacridone-based red pigment, and is colored in a bluish red color having an L* value of ≤80, an a* value of ≥20, and a b* value of ≤15 in an L*a*b* color system, and the number of cycles of a flexing endurance test at which cracking occurs in a surface of the polyurethane skin film is 100000 or more, when the flexing endurance test is performed on the grain-finished leather-like sheet under an environment of 20° C. using a flexometer after the grain-finished leather-like sheet has been irradiated with carbon arc at a black panel temperature of 63° C. for 100 hours with an irradiance of 500±50 W/m$^2$, using ultraviolet carbon arc lamp light compliant with JIS B 7751. Such a grain-finished leather-like sheet is a polyurethane skin film containing a polyether-based polyurethane, and is colored in a bluish red color having an L* value of ≤80, an a* value of ≥20, and a b* value of ≤15, using a quinacridone-based red pigment. Also, such a grain-finished leather-like sheet is less likely to cause cracking even when it is displayed under store lighting for a long period of time, or used under light for a long period of time.

It is preferable that the polyurethane skin film contains 2 to 10 mass % of the quinacridone-based red pigment as an active component, because the polyurethane skin film can be easily colored in a bluish red color having an L* value of ≤80, an a* value of ≥20, and a b* value of ≤15 in an L*a*b* color system.

It is preferable that the polyurethane skin film contains 0.05 to 0.3 mass % of a hindered amine-based light stabilizer, because the above-described resistance to cracking of the polyurethane skin film is particularly high. Also, it is preferable that the polyurethane skin film contains 0.05 to 0.2 mass % of a hindered amine-based light stabilizer, because the discoloration of the surface of the polyurethane skin film due to bleeding of the hindered amine-based light stabilizer is less likely to occur.

It is preferable that in the polyurethane skin film, the proportion of the hindered amine light stabilizer to the quinacridone-based red pigment is 0.5 to 5 mass %, because a grain-finished leather-like sheet that is less likely to cause cracking over time can be easily obtained.

It is preferable that the polyurethane skin film further contains a phenol-based antioxidant, because a grain-finished leather-like sheet having particularly high resistance to cracking can be easily obtained. It is preferable that the phenol-based antioxidant in the polyurethane skin film as an affective component constitutes 0.01 to 0.5 mass %.

It is preferable that the proportion of the polyether-based polyurethane in all polyurethanes contained in the polyurethane skin film is 60 mass % or more, because the effects of the present invention can be easily achieved significantly.

It is preferable that the grain-finished leather-like sheet includes a fiber base material; a polyurethane porous layer stacked on the fiber base material; and a polyurethane adhesion layer that bonds the polyurethane porous layer and the polyurethane skin film together, wherein the polyurethane skin film includes a polyurethane intermediate layer and a polyurethane outermost layer stacked on the polyurethane intermediate layer, because cracking over time is particularly less likely to occur. It is preferable that the polyurethane porous layer permeates into the fiber base material, and has a thickness of 100 to 600 μm, because cracks over time are less likely to be produced. Furthermore, it is preferable that the fiber base material includes a non-woven fabric of nylon-based fibers that are hollow fibers or lotus root-like fibers, because cracking over times is particularly less likely to occur.

Advantageous Effects of Invention

According to the present invention, there is provided a grain-finished leather-like sheet that includes a polyurethane skin film containing a polyether-based polyurethane, and that is colored in a bluish red color with a quinacridone-based red pigment. Also, the grain-finished leather-like sheet is less likely to cause cracking over time.

BRIEF DESCRIPTION OF DRAWING

The FIGURE shows a schematic cross-sectional view of a grain-finished artificial leather according to an embodiment.

DESCRIPTION OF EMBODIMENT

Hereinafter, an embodiment of a grain-finished leather-like sheet according to the present invention will be described in detail. A grain-finished leather-like sheet according to the present embodiment is a grain-finished leather-like sheet including a polyurethane skin film containing a polyether-based polyurethane. The polyurethane skin film contains a quinacridone-based red pigment, and is colored in a bluish red color having an L* value of ≤80, an a* value of ≥20, and a b* value of ≤15 in an L*a*b* color system. Also, in the grain-finished leather-like sheet, the number of cycles of a light-resistant flexing endurance test at which cracking occurs in a surface of the polyurethane skin film is 100000 or more, when the light-resistant flexing endurance test in which a flexing endurance test is performed under an environment of 20° C. using a flexometer is performed on the grain-finished leather-like sheet after the grain-finished leather-like sheet has been irradiated with carbon arc at a black panel temperature of 63° C. for 100 hours with an irradiance of 500±50 W/m$^2$, using ultraviolet carbon arc lamp light compliant with JIS B 7751.

The FIGURE shows a schematic cross-sectional view illustrating a layer configuration of a grain-finished leather-like sheet 10, which is an example of the grain-finished leather-like sheet. The grain-finished leather-like sheet 10 includes a fiber base material 1, a polyurethane porous layer 2 stacked on the fiber base material 1, a polyurethane skin film 4 including a polyurethane intermediate layer 4a and a polyurethane outermost layer 4b attached to the polyurethane intermediate layer 4a, and a polyurethane adhesion layer 3 that bonds the polyurethane porous layer 2 and the polyurethane skin film 4 together. Note that the grain-finished leather-like sheet is not limited to such a layer configuration, and there is no particular limitation on the grain-finished leather-like sheet, as long as it includes a fiber base material and a polyurethane skin film stacked to the fiber base material, and the polyurethane skin film contains a polyether-based polyurethane and a quinacridone-based red pigment. It is preferable that the polyurethane porous layer is stacked on the fiber base material, and the polyurethane skin film is stacked on the polyurethane porous layer, because the polyurethane porous layer serves as a cushioning layer, thus further improving the light-resistant flexing endurance.

As the fiber base material, artificial leather base materials used for producing artificial leather and synthetic leather base materials used for synthetic leather that have been conventionally known, such as a non-woven fabric, a woven fabric, a knitted fabric, or base materials obtained by impregnating the aforementioned materials with an elastic polymer such as a polyurethane, can be used without any particular limitation. The thickness of the fiber base material is also not particularly limited, but is, for example, preferably about 300 to 3000 μm, and more preferably about 500 to 1500 μm. The type of the fibers that form the fiber base material is also not particularly limited, and, for example, nylon-based fibers, polyester-based fibers, polyolefin-based fibers, and polyurethane-based fibers, and the like can be used without any particular limitation.

The fineness and the configuration of the fibers are also not particularly limited. For example, it is possible to use regular fibers having a fineness of more than 1 dtex, or ultrafine fibers having a fineness of less than 1 dtex. As for the fiber configuration, it is possible to use solid fibers, or fibers having voids, such as hollow fibers or lotus root-like fibers. It is preferable that a non-woven fabric of nylon-based fibers that are hollow fibers or lotus root-like fibers is included as the fiber base material because particularly good light-resistant flexing endurance can be achieved.

The polyurethane for forming the polyurethane porous layer and the polyurethane skin film can be obtained by reacting a urethane raw material containing a polymer polyol, an organic polyisocyanate, and a chain extender. The polyurethane is prepared as an organic solvent solution (e.g., a solution of an organic solvent such as dimethylformamide, methyl ethyl ketone, acetone, or toluene), an aqueous dispersion, or an emulsion during production of the grain-finished leather-like sheet.

Specific examples of the polymer polyol include polyether-based polyols such as polyethylene glycol, polypropylene glycol, polytetramethylene glycol, and poly(methyltetramethylene glycol); polycarbonate-based polyols such as polyhexamethylene carbonate diol, poly(3-methyl-1,5-pentylene carbonate)diol, polypentamethylene carbonate diol, and polytetramethylene carbonate diol; polyester-based polyols such as polyethylene adipate diol, polybutylene adipate diol, polypropylene adipate diol, polybutylene sebacate diol, polyhexamethylene adipate diol, poly(3-methyl-1,5-pentylene adipate)diol, poly(3-methyl-1,5-pentylene sebacate)diol, and polycaprolactone diol, or copolymers thereof. These may be used alone, or in a combination of two or more.

Specific examples of the organic polyisocyanate include hardly yellowing diisocyanates, including, for example, aromatic diisocyanates such as 2,4-tolylene diisocyanate, 2,6-tolylene diisocyanate, 4,4'-diphenylmethane diisocyanate, and xylylene diisocyanate; and non-yellowing diisocyanates, including, for example, aliphatic or alicyclic diisocyanates such as hexamethylene diisocyanate, isophorone diisocyanate, norbornene diisocyanate, and 4,4'-dicyclohexyl methane diisocyanate. If necessary, a multifunctional isocyanate such as trifunctional isocyanate or tetrafunctional isocyanate may also be used. These may be used alone, or in a combination of two or more.

Specific examples of the chain extender include diamines such as hydrazine, ethylenediamine, propylene diamine, hexamethylene diamine, nonamethylene diamine, xylylene diamine, isophoronediamine, piperazine and derivatives thereof, adipic acid dihydrazide, and isophthalic acid dihydrazide; triamines such as diethylenetriamine; tetramines such as triethylene tetramine; diols such as ethylene glycol, propylene glycol, 1,4-butane diol, 1,6-hexane diol, 1,4-bis (β-hydroxyethoxy)benzene, and 1,4-cyclohexane diol; triols such as trimethylol propane; pentaols such as pentaerythritol; and amino alcohols such as amino ethyl alcohol and amino propyl alcohol. These may be used alone, or in a combination of two or more. Monoamines such as ethylamine, propylamine, and butylamine; carboxyl group-containing monoamine compounds such as 4-amino butanoic acid and 6-amino hexanoic acid; monools such as methanol, ethanol, propanol, and butanol may be used together with the chain extender during a chain extending reaction.

The polyurethane for forming the polyurethane porous layer can be formed, for example, by applying, to the surface of the fiber base material, a solution of a polyurethane that can be wet-coagulated, and thereafter immersing the fiber base material in an aqueous coagulation bath to coagulate the porous polyurethane. Also, the polyurethane porous layer may be allowed to permeate into the fiber base material for the purpose of, for example, imparting the shape stability thereto. In this case, the fiber base material is impregnated with the polyurethane solution in advance, and the polyurethane solution is further coated on the fiber base material, and thereafter immersed in an aqueous coagulation bath to coagulate the polyurethane, whereby the porous polyurethane can also be provided inside the fiber base material. The thickness of the polyurethane porous layer is, for example, preferably about 100 to 600 μm, and more preferably about 200 to 400 μm.

The polyurethane skin film containing the polyether-based polyurethane contains a quinacridone-based red pigment, and is colored in a bluish red color having an $L^*$ value of $\leq 80$, an $a^*$ value of $\geq 20$, and a $b^*$ value of $\leq 15$ in an $L^*a^*b^*$ color system.

The polyether-based polyurethane is not particularly limited, as long as it is a polyurethane that can be obtained by reacting a urethane raw material containing a polyether-based polyol as the polymer polyol. Specific examples thereof include a hardly yellowing polyether-based polyurethane that can be obtained by polymerizing a urethane monomer component containing a polyether-based polyol as the polymer polyol and a hardly yellowing diisocyanate that is an aromatic diisocyanate as the organic polyisocyanate; and a non-yellowing polyether-based polyurethane that can be obtained by polymerizing a urethane monomer component containing a polyether-based polyol as the polymer polyol and a non-yellowing diisocyanate that is an aliphatic or alicyclic diisocyanate as the organic polyisocyanate. These may be used alone, or in a combination of two or more.

The proportion of the polyether-based polyurethane in all polyurethanes contained in the polyurethane skin film is preferably 60 mass % or more, more preferably 80 mass % or more, and particularly preferably 90 to 100 mass %, because the effects of the present invention can be significantly achieved. That is, in a grain-finished leather-like sheet including a polyurethane skin film containing the polyether-based polyurethane, cracking over time is made less likely to occur when a polyurethane skin film colored in a bluish red color having an $L^*$ value of $\leq 80$, an $a^*$ value of $\geq 20$, and a $b^*$ value of $\leq 15$ is formed using a quinacridone-based red pigment.

The polyurethane skin film containing the polyether-based polyurethane contains a quinacridone-based red pigment, and is colored in a bluish red color having an $L^*$ value of $\leq 80$, an $a^*$ value of $\geq 20$, and a $b^*$ value of $\leq 15$ in an $L^*a^*b^*$ color system. Specific examples of the quinacridone-based red pigment include quinacridone red (Pigment Red 122), dichloroquinacridone magenta (Pigment Red 202, Pigment Red 209), quinacridone magenta, and quinacridone violet. The polyurethane skin film may contain other pigments within the range of an $L^*$ value of $\leq 80$, an $a^*$ value of $\geq 20$, and a $b^*$ value of $\leq 15$. Examples of the other pigments include, but are not particularly limited to, anthraquinone-based pigments, diketopyrrolopyrrole-based pigments, and perylene-based pigments.

The content of the quinacridone-based red pigment contained in the polyurethane skin film is not particularly limited, as long as the polyurethane skin film can be colored in a bluish red color having an $L^*$ value of $\leq 80$, an $a^*$ value of $\geq 20$, and a $b^*$ value of $\leq 15$, and the content may be adjusted as appropriate according to the intended color, the type of the quinacridone-based red pigment, and the pigment composition. Specifically, the content of the quinacridone-based red pigment contained in the polyurethane skin film, as the active component of the quinacridone-based red pigment, is preferably 0.5 to 15 mass %, more preferably 1 to 10 mass %, and particularly preferably 2 to 10 mass %. Here, the active component of the quinacridone-based red pigment means the quinacridone-based red pigment alone, excluding a solvent and an additive such as a binder that are contained in the pigment composition to be mixed.

Preferably, a light stabilizer such as a radical scavenger and a radical chain initiation inhibitor is added to the polyurethane skin film containing the quinacridone-based red pigment in order for the number of cycles at which cracking occur in the surface to be 100000 or more in the light-resistant flexing endurance test.

Specific examples of the radical scavenger include a hindered amine light stabilizer (HALS) such as tetrakis(1,2,2,6,6-pentamethyl-4-piperidyl)butane-1,2,3,4-tetracarboxylate, tetrakis(2,2,6,6-tetramethyl-4-piperidyl)butane-1,2,3,4-tetracarboxylate, bis(1,2,2,6,6-pentamethyl-4-piperidyl)sebacate, bis(2,2,6,6-tetramethyl-4-piperidyl)sebacate, bis(1-undecanoxy-2,2,6,6-tetramethyl piperidine-4-yl)carbonate, 1,2,2,6,6-pentamethyl-4-piperidyl methacrylate, and 2,2,6,6-tetramethyl-4-piperidyl methacrylate; phenol-based antioxidants such as dibutyl hydroxy toluene (BHT), 6,6'-di-t-butyl-4,4'-butylidene-m-cresol, 1,3,5-tris(3,5-di-t-butyl-4-hydroxybenzyl)-1,3,5-triazine-2,4,6 (1H,3H,5H)-trione, 4,4',4"-(1-methyl propanil-3-ylidene) tris(6-t-butyl-m-cresol), 1,3,5-tris(3,5-di-t-butyl-4-hydroxyphenyl methyl)-2,4,6-trimethyl benzene, and octadecyl-3-(3,5-di-t-butyl-4-hydroxyphenyl)propionate.

Specific examples of the radical chain initiation inhibitor include benzotriazole-based ultraviolet absorbers such as 2-(2H-benzotriazole-2-yl)-4,6-bis(1-methyl-1-phenylethyl) phenol, 2-(2H-benzotriazole-2-yl)-4-(1,1,3,3-tetramethyl butyl)phenol, and 2-(2H-benzotriazole-2-yl)-p-cresol, and 2-(5-chloro-2H-benzotriazole-2-yl)-6-t-butyl-4-methyl phenol; triazine-based ultraviolet absorbers such as 2-(4,6-diphenyl-1,3,5-triazine-2-yl)-5-[2-(2-ethylhexanoyloxy) ethoxy]phenol, and 2,4,6-tris(2-hydroxy-4-hexyloxy-3-methyl phenyl)1,3,5-triazine; benzophenone-based ultraviolet absorbers such as [2-hydroxy-4-(octyloxy)phenyl](phenyl)methanone.

The light stabilizers may be used alone, or in a combination of two or more. Among these, it is particularly preferable to use HALS and a phenol-based antioxidant in combination.

In the case of mixing HALS in the polyurethane skin film, the mixing proportion thereof is not particularly limited as long as it is such a proportion at which the number of cycles at which cracking occurs in the surface in the light-resistant flexing endurance test is 100000 or more. The content proportion of the HALS contained in the polyurethane skin film, as the active component proportion, is preferably 0.01 to 0.5 mass %, more preferably 0.05 to 0.3 mass %, and particularly preferably 0.05 to 0.2 mass %. If the content proportion of the HALS is too high, the HALS tends to bleed to the surface of the polyurethane skin film, thus degrading the external appearance. On the other hand, if the content proportion of the HALS is too low, the number of cycles at which cracking occurs in the surface in the light-resistant flexing endurance test is less likely to be 100000 or more. Here, the active component proportion of the HALS is the proportion of the HALS alone, excluding a solvent and an additive such as a binder that are contained in the light stabilizer composition to be mixed.

In the case of mixing the phenol-based antioxidant in the polyurethane skin film, the mixing proportion thereof is also not particularly limited as long as it is such a proportion at which the number of cycles at which cracking occurs in the surface in the light-resistant flexing endurance test is 100000 or more. The content proportion of the phenol-based antioxidant contained in the polyurethane skin film, as the active component proportion, is preferably 0.01 to 0.5 mass %, and more preferably 0.05 to 0.15 mass %. If the content proportion of the phenol-based antioxidant is too low, the number of cycles at which cracking occurs in the surface in the light-resistant flexing endurance test tends to be less likely to be 100000 or more. If the content proportion of the phenol-based antioxidant is too high, the phenol-based antioxidant tends to bleed to the surface of the polyurethane skin film, thus degrading the external appearance. Here, the active component proportion of the phenol-based antioxidant is the proportion of the phenol-based antioxidant alone, excluding a solvent and an additive such as a binder that are contained in the light stabilizer composition to be mixed.

The proportion of the hindered amine light stabilizer to the quinacridone-based red pigment is preferably 0.2 to 10 mass %, and more preferably 0.5 to 5 mass %, because cracking in the polyurethane skin film that is colored in a red-based color can be more easily suppressed.

For example, in the case of bonding the polyurethane skin film to the surface of a polyurethane porous layer, the following method using dry forming can be employed.

A polyurethane film for forming a polyurethane skin film is formed on release paper. Note that if the polyurethane skin film has a stacked structure including a polyurethane intermediate layer and a polyurethane outermost layer attached to the polyurethane intermediate layer, a polyurethane skin film having a stacked structure including a polyurethane outermost layer and a polyurethane intermediate layer can be formed, for example, by forming a film of the polyurethane outermost layer on the release paper, and forming, on the film of the polyurethane outermost layer, a polyurethane film for forming the polyurethane intermediate layer. The polyurethane skin film may be either unfoamed or foamed, but is particularly preferably unfoamed.

The thickness of the polyurethane skin film is preferably 10 to 100 μm, and more preferably 20 to 50 μm. If the polyurethane skin film is too thin, the abrasion resistance of the surface tends to be reduced, or the color development tends to be insufficient.

A polyurethane adhesive is applied to the film of the polyurethane skin film, then dried by removed the solvent completely or incompletely. Then, the polyurethane adhesive stacked on the film of the polyurethane skin film thus formed on the release paper is attached to the surface of the polyurethane porous layer, and then pressed, followed by curing the polyurethane adhesive, thus bonding the polyurethane skin film and the polyurethane porous layer via the polyurethane adhesion layer. Then, the release paper is released from the surface of the polyurethane skin film, whereby a grain-finished leather-like sheet including the polyurethane skin film is obtained.

The thickness of the polyurethane adhesion layer is preferably 5 to 200 μm, and more preferably 30 to 70 μm. If the polyurethane adhesion layer is too thick, the bending resistance tends to be reduced, resulting in a reduced bonding strength.

The total thickness of the polyurethane skin film and the polyurethane adhesion layer is preferably about 10 to 300 μm, more preferably about 30 to 200 μm, and particularly preferably about 50 to 100 μm, because the balance between the mechanical properties and the texture can be maintained.

The grain-finished leather-like sheet according to the present embodiment is a grain-finished leather-like sheet in which the polyurethane skin film contains a quinacridone-based red pigment, and is colored in a bluish red color having an $L^*$ value of ≤80, an $a^*$ value of ≥20, and a $b^*$ value of ≤15 in an $L^*a^*b^*$ color system, and the number of cycles of a light-resistant flexing endurance test at which cracking occurs in a surface of the polyurethane skin film is 100000 or more, when the light-resistant flexing endurance test in which a flexing endurance test is performed under an environment of 20° C. using a flexometer is performed on the grain-finished leather-like sheet after the grain-finished leather-like sheet has been irradiated with carbon arc at a black panel temperature of 63° C. for 100 hours with an irradiance of 500±50 W/m², using ultraviolet carbon arc lamp light compliant with JIS B 7751.

Note that the statement "colored in a bluish red color having an L* value of ≤80, an a* value of ≥20, and a b* value of ≤15 in an L*a*b* color system" is based on the coordinate values of an L*a*b* color system obtained by measuring, using a spectrophotometer, the color of the colored surface in a red-based color, which is the design surface of the grain-finished leather-like sheet. The red coloration has preferably an L* value of ≤80, an a* value of ≥20, and a b* value of ≤15, more preferably satisfies L* value ≤50, a* value ≥25, and −100≤b* value ≤15, and even more preferably satisfies L* value ≤50, a* value ≥25, and −20≤b* value ≤15. Such a bluish red color is more likely to be obtained by using a quinacridone-based red pigment. Note that in an L*a*b* color system, a color is bluish when if b* value ≤15 is satisfied, and the higher the b* value, the more yellowish the color becomes. A color is reddish if a* value ≥25 is satisfied, and the lower the a* value, and the more greenish the color becomes.

The grain-finished leather-like sheet of the present embodiment is a grain-finished leather-like sheet that has been adjusted such that the number of cycles of a light-resistant flexing endurance test at which cracking occurs in a surface of the polyurethane skin film is 100000 or more, when the light-resistant flexing endurance test in which a flexing endurance test is performed under an environment of 20° C. using a flexometer is performed on the grain-finished leather-like sheet after the grain-finished leather-like sheet has been irradiated with carbon arc at a black panel temperature of 63° C. for 100 hours with an irradiance of 500±50 W/m², using ultraviolet carbon arc lamp light compliant with JIS B 7751. According to an evaluation using such a light-resistant flexing endurance test, the reduction in the flexing endurance due to exposure to ultraviolet light can be quantitatively evaluated. Also, using such an evaluation method, the present inventors have found that cracking due to accelerated degradation is likely to occur in a grain-finished leather-like sheet including a red-colored polyurethane skin film obtained by mixing a quinacridone-based red pigment with a polyurethane skin film containing a polyether-based polyurethane. Although the number of cycles at which the grain-finished leather-like sheet according to the present embodiment causes cracking in the light-resistant flexing endurance test is 100000 or more, the number of cycles is preferably 200000 or more, and more preferably 300000 or more, because cracking over time is further less likely to occur in a grain-finished leather-like sheet including a polyurethane skin film colored in a red color with a quinacridone-based red pigment.

The grain-finished leather-like sheet according to the present embodiment described above can be suitably used as a grain-finished leather-like sheet that has a grain-finished external appearance resembling a natural leather, and that is used as the skin material of bags, clothing, shoes, and the like. In particular, the grain-finished leather-like sheet of the present invention can be suitably used for the applications, such as bags, of grain-finished leather-like sheets that are required to be colored in a great variety of red-based colors.

EXAMPLES

Hereinafter, the present invention will be described in further detail by way of examples. It should be appreciated that the scope of the invention is by no means limited to the examples.

Example 1

Island-in-the-sea composite fibers including 45 parts by mass (sea component) of 6-nylon and 55 parts by mass of polystyrene (island component) was melt-spun, then drawn by 3 times, and a fiber oil solution was applied to the fibers, which were then mechanically crimped, and thereafter dried. The resulting crimped fibers were cut into 3-dtex staples of 51 mm, which were then used to form a web, and thereafter, the web was needle-punched alternately from both sides at a total density of about 500 punches/cm², to obtain an entangled non-woven fabric. The entangled non-woven fabric has a basis weight of 350 g/m² and an apparent specific gravity of 0.17. The entangled non-woven fabric was treated with a 4% aqueous solution of polyvinyl alcohol, then compression-set to have a thickness of about 1.3 mm, and the surface was smoothed by buffing. Then, the non-woven fabric was impregnated with a dimethylformamide (hereinafter referred to as "DMF") solution of a polyurethane composed mainly of a polyester-based polyurethane at a concentration of 13%. Furthermore, the same polyurethane solution was applied to the surface of the non-woven fabric in an amount of 100 g/m² as a solid content, and thereafter the non-woven fabric was immersed in a DMF/water liquid mixture, to wet-coagulate the polyurethane into a porous structure. Then, the island component was removed by dissolution in hot toluene, to convert the island-in-the-sea composite fibers into hollow fibers. Thus, a fiber base material having the polyurethane porous layer stacked on and permeated in a surface layer thereof was obtained. The polyurethane porous layer had a thickness of 300 μm.

Next, a polyurethane composition solution that contained 100 parts by mass of a 30% solution of a hardly yellowing polyether-based polyurethane including a polyether-based polyurethane containing an aromatic diisocyanate unit as an organic polyisocyanate unit and a polyether-based polyol unit as a polymer polyol unit, 21 parts by mass of a red vehicle containing 15 mass % of quinacridone red (Pigment Red 122), 11 parts by mass of a red vehicle containing 15 mass % of anthraquinone red, 2 parts by mass of a white vehicle containing titanium oxide, 0.1 parts by mass of a black vehicle containing carbon black, 0.03 parts by mass of bis(2,2,6,6-tetramethyl-4-piperidyl)sebacate (HALS), 0.025 parts by mass of 6,6'-di-t-butyl-4,4'-butylidene-m-cresol (BHT), 30 parts by mass of DMF, and 30 parts by mass of methyl ethyl ketone was applied onto release paper (R-70 manufactured by LINTEC Corporation) such that the thickness after drying was 15 μm, and dried, to form a polyurethane outermost layer. Then, the above-described polyurethane composition solution was further applied onto the polyurethane outermost layer such that the thickness after drying was 20 μm, and dried, to form a polyurethane intermediate layer. A polyurethane skin film thus colored in a red color was formed. Thus, a red polyurethane skin film containing 9.1 mass % of quinacridone red, 0.09 mass % of bis(2,2,6,6-tetramethyl-4-piperidyl)sebacate, and 0.07 mass % of 6,6'-di-t-butyl-4,4'-butylidene-m-cresol was formed.

Then, 130 g/m² of a polyurethane-based adhesive solution was applied to the surface of the polyurethane intermediate layer, which was dried for 15 seconds at 120° C. to vaporize the solvent, and thereafter attached to the polyurethane porous layer. Note that a polyurethane-based adhesive solution containing, as an adhesive component, 100 parts by mass of a cross-linkable polyurethane-based adhesive to which a crosslinking agent and a cross-linking accelerator were added, and containing 5 parts by mass of DMF and 10 parts by mass of ethyl acetate as solvents was used as the polyurethane-based adhesive solution. Then, the polyurethane adhesive was allowed to permeate the polyurethane porous layer, while the resulting stack intermediate were pressure-bonded by being pressed by a roll of the polyurethane porous layer and the fiber base material, with a clearance corresponding to about 65% of a total thickness of 1.6 mm provided therebetween. Then, after 3-minute drying at 130° C., the whole was subjected to aging treatment at 50° C. for 3 days, and thereafter the release paper was released, whereby a grain-finished artificial leather, which was a grain-finished leather-like sheet in a bluish red color, was obtained.

Then, the obtained grain-finished artificial leather was evaluated as follows.

(Color Measurement)

The coordinate values in the L*a*b* color system of the surface of the grain-finished artificial leather were measured using a spectrophotometer (CM-3700 manufactured by Minolta). The measurement was performed using three samples (N=3), and the average value was calculated.

(Light-Resistant Flexing Endurance Test)

The grain-finished artificial leather was irradiated with carbon arc light at a relative humidity of 50±5° C. and a black panel temperature of 63° C. for 100 hours with an irradiance of 500±50 W/m$^2$, using ultraviolet carbon arc lamp light compliant with JIS B 7751. Then, a flexing endurance test was performed on the grain-finished artificial leather under an environment of a relative humidity of 65±5% and a temperature of 20±2° C., using a flexometer compliant with JIS K 6545, and the presence or absence of the occurrence of cracking in the surface was checked for every 100000 flexing cycles. Cracking was visually checked using a 30× magnifier. Then, the number of cycles were determined as "Under 100000" when cracking was confirmed after 100000 cycles, and as "100000" when cracking was confirmed after 200000 cycles. For the rest of the test, the determination was made in the same manner for every "100000 cycles". Note that each cycle was performed using three samples (N=3). Then, it was determined that cracking occurred when cracking occurred in one of the samples. Note that the flexing endurance without irradiation of carbon arc light was also evaluated in the same manner.

(Bleeding Evaluation)

In checking the cracking after the above-described light-resistant flexing endurance test, the presence or absence of discoloration due to bleeding of HALS or BHT to the surface was checked.

The above-described results are shown in Table 1 below.

TABLE 1

| | | Polyurethane skin film | | | | | | |
|---|---|---|---|---|---|---|---|---|
| Example No. | Polyurethane | Red pigment (mass %) | | Light stabilizer (mass %) | | Antioxidant (mass %) | | Proportion of HALS to red pigment (mass %) |
| 1 | Polyether-based | Pigment Red 122 (quinacridone red) | 9.1 | HALS | 0.09 | BHT | 0.07 | 1.0 |
| 2 | Polyether-based | Pigment Red 122 (quinacridone red) | 9.1 | HALS | 0.18 | BHT | 0.07 | 2.0 |
| 3 | Polyether-based | Pigment Red 122 (quinacridone red) | 9.1 | HALS | 0.27 | BHT | 0.07 | 3.0 |
| 4 | Polyether-based | Pigment Red 122 (quinacridone red) | 9.1 | HALS | 0.09 | BHT | 0 | 1.0 |
| 5 | Polyether-based | Pigment Red 122 (quinacridone red | 2.7 | HALS | 0.09 | BHT | 0.07 | 3.3 |
| 6 | Polyether-based | Pigment Red 202 (quinacridone red) | 8.4 | HALS | 0.08 | BHT | 0.07 | 1.0 |
| 7 | Polyether-based/ polyester-based = 60/40 | Pigment Red 122 (quinacridone red) | 9.1 | HALS | 0.08 | BHT | 0.07 | 0.9 |
| Com. Ex. 1 | Polyether-based | Pigment Red 122 (quinacridone red) | 9.1 | HALS | 0.001 | BHT | 0.001 | 0.0 |
| Com. Ex. 2 | Polyether-based | Pigment Red (Anthraquinone-based) | 9.1 | HALS | 0.001 | BHT | 0.001 | 0.0 |
| Com. Ex. 3 | Polycarbonate-based | Pigment Red 122 (quinacridone red) | 9.1 | HALS | 0.001 | BHT | 0.001 | 0.0 |
| Com. Ex. 4 | Polycarbonate-based | Pigment Red (Anthraquinone-based) | 9.1 | HALS | 0.001 | BHT | 0.001 | 0.0 |

| | Evaluation results | | | | | |
|---|---|---|---|---|---|---|
| Example No. | L* | a* | b* | Light-resistant flexing endurance | Flexing endurance (without irradiation) | Bleeding |
| 1 | 35.4 | 26.8 | 3.3 | 300000 | Over 500000 | Not occurred |
| 2 | 35.6 | 25.9 | 3.3 | 300000 | Over 500000 | Not occurred |

TABLE 1-continued

| | | | | | | |
|---|---|---|---|---|---|---|
| 3 | 35.6 | 26.2 | 3.2 | 400000 | Over 500000 | Occurred |
| 4 | 35.4 | 27.0 | 3.5 | 100000 | Over 500000 | Not occurred |
| 5 | 47.9 | 44.4 | 12.7 | 300000 | Over 500000 | Not occurred |
| 6 | 34.5 | 31.2 | 5.5 | 300000 | Over 500000 | Not occurred |
| 7 | 35.3 | 27.5 | 3.5 | 300000 | Over 500000 | Not occurred |
| Com. Ex. 1 | 35.4 | 26.8 | 2.9 | Under 100000 | Over 500000 | Not occurred |
| Com. Ex. 2 | 41.8 | 45.9 | 17.1 | Over 500000 | Over 500000 | Not occurred |
| Com. Ex. 3 | 37.5 | 27.5 | 3.5 | 200000 | Over 500000 | Not occurred |
| Com. Ex. 4 | 46.3 | 44.1 | 16.5 | Over 500000 | Over 500000 | Not occurred |

Example 2

A grain-finished artificial leather was obtained and evaluated in the same manner as in Example 1 except that the polyurethane skin film contained HALS in an amount of 0.18 mass % instead of 0.09 mass %. The results are shown in Table 1.

Example 3

A grain-finished artificial leather was obtained and evaluated in the same manner as in Example 1 except that the polyurethane skin film contained HALS in an amount of 0.27 mass % instead of 0.09 mass %. The results are shown in Table 1.

Example 4

A grain-finished artificial leather was obtained and evaluated in the same manner as in Example 1 except that the polyurethane skin film did not contain BHT, instead of containing 0.07 mass % of BHT. The results are shown in Table 1.

Example 5

A grain-finished artificial leather was obtained and evaluated in the same manner as in Example 1 except that the polyurethane composition solution for forming the polyurethane intermediate layer and the polyurethane outermost layer contained 5.6 parts by mass of a red vehicle containing 15 mass % of quinacridone red (Pigment Red 122), 9.4 parts by mass of a white vehicle containing titanium oxide, and 3.1 parts by mass of a yellow vehicle containing disazo yellow, instead of containing 21 parts by mass of a red vehicle containing 15 mass % of quinacridone red (Pigment Red 122), 11 parts by mass of a red vehicle containing 15 mass % of anthraquinone red, 2 parts by mass of a white vehicle containing titanium oxide, and 0.1 parts by mass of a black vehicle containing carbon black. The polyurethane skin film contained 2.7 mass % of quinacridone red, 0.09 mass % of bis(2,2,6,6-tetramethyl-4-piperidyl)sebacate, and 0.07 mass % of 6,6'-di-t-butyl-4,4'-butylidene-m-cresol. The results are shown in Table 1.

Example 6

A grain-finished artificial leather was obtained and evaluated in the same manner as in Example 1 except that the polyurethane composition solution for forming the polyurethane intermediate layer and the polyurethane outermost layer contained 21 parts by mass of a red vehicle containing 15 mass % of quinacridone red (Pigment Red 202), 11 parts by mass of a red vehicle containing 15 mass % of anthraquinone red, 2 parts by mass of a white vehicle containing titanium oxide, and 0.1 parts by mass of a black vehicle containing carbon black, instead of containing 21 parts by mass of a red vehicle containing 15 mass % of quinacridone red (Pigment Red 122), 11 parts by mass of a red vehicle containing 15 mass % of anthraquinone red, 2 parts by mass of a white vehicle containing titanium oxide, and 0.1 parts by mass of a black vehicle containing carbon black. The polyurethane skin film contained 8.4 mass % of quinacridone red, 0.08 mass % of bis(2,2,6,6-tetramethyl-4-piperidyl)sebacate, and 0.07 mass % of 6,6'-di-t-butyl-4,4'-butylidene-m-cresol. The results are shown in Table 1.

Example 7

A grain-finished artificial leather was obtained and evaluated in the same manner as in Example 1 except that the content proportion of the polyether-based polyurethane in all the polyurethanes contained in the polyurethane skin film was changed to 60 mass % by using a mixture of a hardly yellowing polyether-based polyurethane and a polyester-based polyurethane containing an aromatic diisocyanate as an organic polyisocyanate unit and a polyester-based polyol as a polymer polyol unit, in place of a 30% solution of a hardly yellowing polyether-based polyurethane including a polyether-based polyurethane containing an aromatic diisocyanate as an organic polyisocyanate unit and a polyether-based polyol as a polymer polyol unit. The results are shown in Table 1.

Comparative Example 1

A grain-finished artificial leather was obtained and evaluated in the same manner as in Example 1 except that the polyurethane skin film contained 0.001 mass % of HALS and 0.001 mass % of BHT, instead of containing 0.09 mass % of HALS and 0.07 mass % of BHT. The results are shown in Table 1.

Comparative Example 2

A grain-finished artificial leather was obtained and evaluated in the same manner as in Example 1 except that the polyurethane composition solution for forming the polyurethane intermediate layer and the polyurethane outermost layer contained a red vehicle containing 15 mass % of anthraquinone red, instead of containing a red vehicle containing 15 mass % of quinacridone red (Pigment Red 122), whereby an attempt was made to color the polyurethane skin layer in a red color similar to that of Example 1. The results are shown in Table 1. Although an attempt was made to color the polyurethane skin layer in a bluish red color, it was not possible to obtain a bluish red color equivalent to that of Example 1.

Comparative Example 3

A grain-finished artificial leather was obtained and evaluated in the same manner as in Comparative Example 1 except that the polyurethane composition solution for forming the polyurethane intermediate layer and the polyurethane outermost layer contained 100 parts by mass of a 30% solution of a non-yellowing polycarbonate-based polyurethane including a polycarbonate-based polyurethane containing an aliphatic diisocyanate as an organic polyisocyanate unit and a polycarbonate-based polyol as a polymer polyol unit, instead of containing 100 parts by mass of a 30% solution of a hardly yellowing polyether-based polyurethane. The results are shown in Table 1.

Comparative Example 4

A grain-finished artificial leather was obtained and evaluated in the same manner as in Comparative Example 2 except that the polyurethane composition solution for forming the polyurethane intermediate layer and the polyurethane outermost layer contained 100 parts by mass of a 30% solution of a hardly yellowing polycarbonate-based polyurethane including a polycarbonate-based polyurethane containing an aromatic diisocyanate as an organic polyisocyanate unit and a polycarbonate-based polyol as a polymer polyol unit, instead of containing 100 parts by mass of a 30% solution of a hardly yellowing polyether-based polyurethane, whereby an attempt was made to color the polyurethane skin layer in a color similar to that of Example 1. The results are shown in Table 1.

Referring to Table 1, all of the grain-finished artificial leathers obtained in Examples 1 to 7 according to the present invention were colored in a bluish red color having an L* value of ≤80, an a* value of ≥20, and a b* value of ≤15, and had excellent light-resistant flexing endurance. On the other hand, the grain-finished artificial leather obtained in Comparative Example 1 contained the light stabilizer in a smaller amount, and was therefore inferior in light-resistant flexing endurance. The grain-finished artificial leather obtained in Comparative Example 2, which was colored using an anthraquinone-based red pigment, had excellent light-resistant flexing endurance despite containing the light stabilizer in a smaller amount, but had a b* value of 17.1, and lacked blueness. Note that the grain-finished artificial leather obtained in Comparative Example 4, which had a polyurethane skin film free of a polyether-based polyurethane, lacked blueness. However, it was not inferior in light-resistant flexing endurance despite containing the light stabilizer in a smaller amount.

REFERENCE SIGNS LIST

1. . . . Fiber base material
2. . . . Polyurethane porous layer
3. . . . Polyurethane adhesion layer
4. . . . Polyurethane skin film
4a . . . . Polyurethane intermediate layer
4b . . . . Polyurethane outermost layer
10. . . . Grain-finished leather-like sheet

The invention claimed is:

1. A grain-finished leather-like sheet, comprising:
a fiber base material and
a polyurethane skin film comprising a polyether-based polyurethane, a quinacridone-based red pigment, and a hindered amine light stabilizer
wherein the polyurethane skin film is colored in a red color having an L* value of ≤80, an a* value of ≥20, and a b* value of ≤15 in an L*a*b* color system, and
the number of cycles of a flexing endurance test at which cracking occurs in a surface of the polyurethane skin film is 100,000 or more, when the flexing endurance test is performed on the grain-finished leather-like sheet under an environment of 20° C. using a flexometer after the grain-finished leather-like sheet has been irradiated with carbon arc at a black panel temperature of 63° C. for 100 hours with an irradiance of 500±50 W/m$^2$, using ultraviolet carbon arc lamp light compliant with JIS B 7751.

2. The grain-finished leather-like sheet according to claim 1,
wherein the polyurethane skin film comprises 2 to 10 mass % of the quinacridone-based red pigment as an active component.

3. The grain-finished leather-like sheet according to claim 1,
wherein the polyurethane skin film comprises 0.05 to 0.3 mass % of the hindered amine light stabilizer.

4. The grain-finished leather-like sheet according to claim 1,
wherein the polyurethane skin film comprises 0.05 to 0.2 mass % of the hindered amine light stabilizer.

5. The grain-finished leather-like sheet according to claim 3,
wherein a proportion of the hindered amine light stabilizer to the quinacridone-based red pigment is 0.5 to 5 mass %.

6. The grain-finished leather-like sheet according to claim 3,
wherein the polyurethane skin film further comprises a phenol-based antioxidant.

7. The grain-finished leather-like sheet according to claim 6, comprising:
0.01 to 0.5 mass % of the phenol-based antioxidant as an active component.

8. The grain-finished leather-like sheet according to claim 1,
wherein a content proportion of the polyether-based polyurethane in all polyurethanes contained in the polyurethane skin film is 60 mass % or more.

9. The grain-finished leather-like sheet according to claim 1, further comprising:
a polyurethane porous layer stacked on the fiber base material; and
a polyurethane adhesion layer that bonds the polyurethane porous layer and the polyurethane skin film together,
wherein the polyurethane skin film comprises a polyurethane intermediate layer and a polyurethane outermost layer stacked on the polyurethane intermediate layer.

10. The grain-finished leather-like sheet according to claim 9,
wherein the polyurethane porous layer permeates into the fiber base material, and has a thickness of 100 to 600 µm.

11. The grain-finished leather-like sheet according to claim 1,
wherein the fiber base material comprises a non-woven fabric of nylon-based fibers that are hollow fibers or lotus root-like fibers.

12. The grain-finished leather-like sheet according to claim 1,
wherein the polyurethane skin film further comprises and a phenol-based antioxidant.

13. The grain-finished leather-like sheet according to claim 12, wherein the polyurethane skin film comprises 0.05 to 0.3 mass % of the hindered amine light stabilizer and 0.01 to 0.5 mass % of the phenol-based antioxidant as an active component.

14. The grain-finished leather-like sheet according to claim 13, further comprising:
a polyurethane porous layer stacked on the fiber base material; and
a polyurethane adhesion layer that bonds the polyurethane porous layer and the polyurethane skin film together,
wherein the polyurethane skin film comprises a polyurethane intermediate layer and a polyurethane outermost layer stacked on the polyurethane intermediate layer.

15. The grain-finished leather-like sheet according to claim 13,
wherein the polyurethane skin film comprises 2 to 10 mass % of the quinacridone-based red pigment as an active component.

16. The grain-finished leather-like sheet according to a claim 15, further comprising:
a polyurethane porous layer stacked on the fiber base material; and
a polyurethane adhesion layer that bonds the polyurethane porous layer and the polyurethane skin film together,
wherein the polyurethane skin film comprises a polyurethane intermediate layer and a polyurethane outermost layer stacked on the polyurethane intermediate layer.

* * * * *